July 2, 1935.　　　　H. A. MILLS　　　　2,006,838
WATER HEATER
Original Filed April 19, 1930　　2 Sheets-Sheet 1
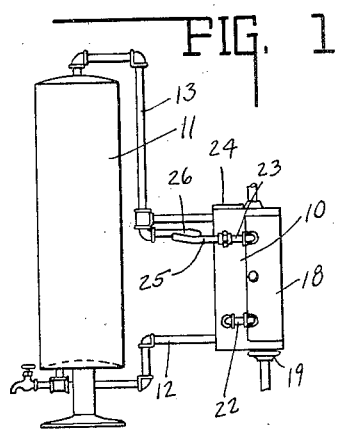
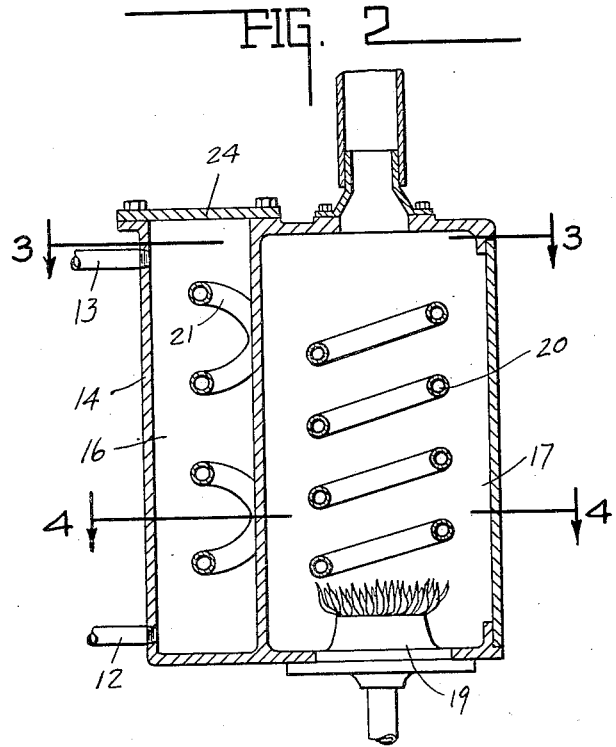
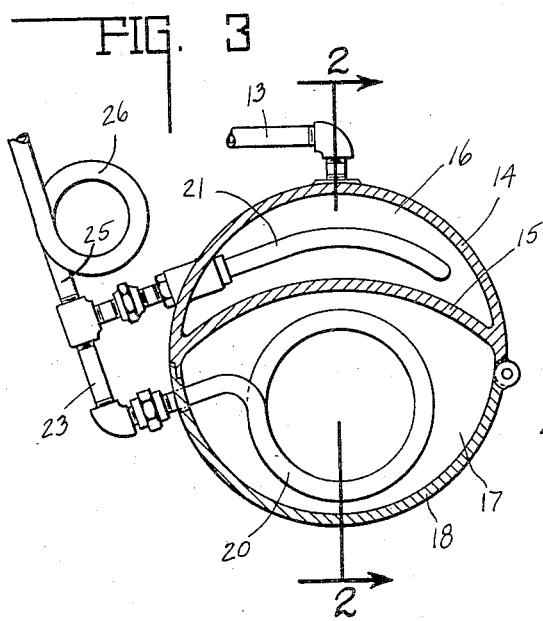
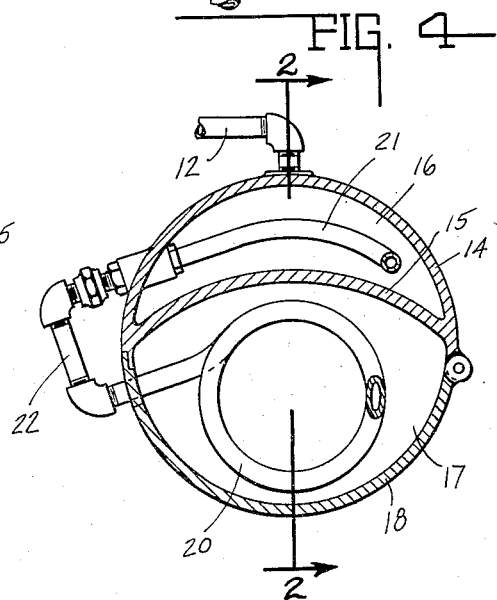
INVENTOR.
HARRY A. MILLS.
BY
Lockwood Lockwood Goldsmith & Galt
ATTORNEYS.

July 2, 1935.  H. A. MILLS  2,006,838
WATER HEATER
Original Filed April 19, 1930  2 Sheets-Sheet 2
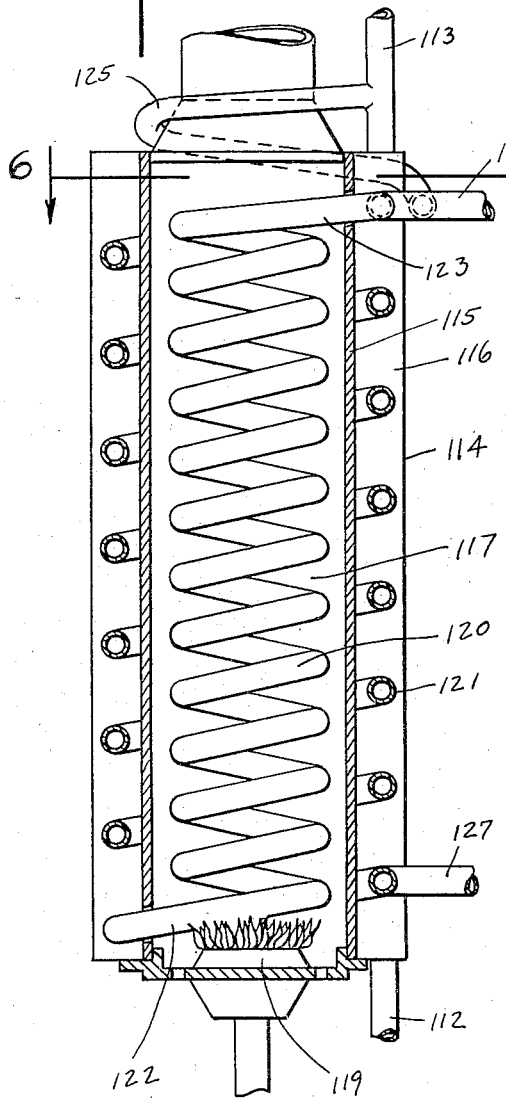
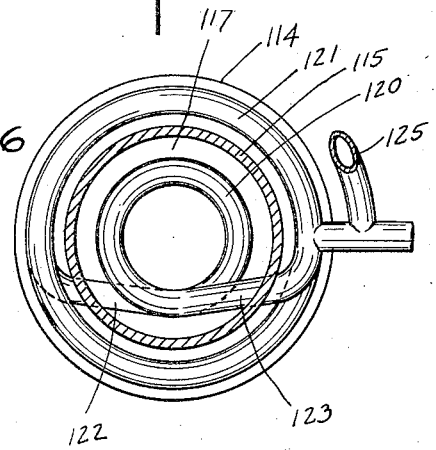
INVENTOR.
HARRY A. MILLS.
BY
Lockwood Lockwood Goldsmith & Galt.
ATTORNEYS.

Patented July 2, 1935

2,006,838

UNITED STATES PATENT OFFICE 2,006,838

WATER HEATER

Harry A. Mills, Noblesville, Ind.

Refile for abandoned application Serial No. 445,597, April 19, 1930. This application October 18, 1934, Serial No. 748,941

3 Claims. (Cl. 122—32)

This invention relates to a method and apparatus for heating water, particularly for use with "hard" water containing a high percentage of encrusting chemicals.

The principal object of the invention is to provide a method and apparatus of heating water such that the said chemicals are largely prevented from being deposited upon the heating surface and in which no softening means of a chemical nature is used. In heating water by the methods heretofore in common use, it has been the practice to bring the water to be heated into contact with one side of a heat transfer surface, the opposite side of which is heated by a flame at high temperature. The water is thus brought to a high enough temperature to deposit encrusting solids although the final desired temperature of the water may be considerably lower. The said solids reduce the efficiency of the heat transfer surface and, in the case of such surfaces formed of pipes or tubes, this often results in clogging and burning out of the tubes.

The principal feature of the invention resides in the provision of a means of circulating a quantity of water about a closed path. The said water is heated in a heater coil at one point in said path and at another point is passed through a secondary heat-exchanging element in contact with a second body of water to be heated. The heat, therefore, is transferred from the circulated water to the water to be heated in the said secondary heat-exchanging element. The circulated water at the point where it is heated is brought to a temperature sufficient to deposit the encrusting solids therein, but since the same water is repeatedly reheated, the deposition of said solids is not repeated. At the point of transfer of heat from the circulated water to the second body of water, the second body of water is ordinarily not brought to a temperature for deposition of chemicals. The secondary heat transfer element, therefore, is also maintained at its greatest efficiency.

A connection is provided between the circulating water path and the water to be heated for maintaining a sufficient quantity of circulating water and for preventing excess pressure in the circulating water path in case the said water is heated above its boiling point. The said connection is arranged, however, so that the tendency of water to flow therethrough is reduced to the minimum. The circulating water, therefore, after being once heated, is not greatly hardened by the addition of hard water through the said connection.

Other features of the invention reside in the specific form of apparatus herein disclosed although other apparatus may be used for carrying out the method of the invention.

Other objects and features of the invention will be understood from the accompanying drawings and the following description and claims:

Fig. 1 illustrates a heater embodying the invention herein shown connected to a storage reservoir for hot water. Fig. 2 is a vertical central section through said heater taken on the line 2—2 of Figs. 3 and 4. Figs. 3 and 4 are horizontal sectional views of the said heater taken on the line 3—3 and 4—4 respectively of Fig. 2. Fig. 5 is a vertical central section through an alternative form of heater embodying the invention. Fig. 6 is a horizontal sectional view taken on line 6—6 of Fig. 5.

In Fig. 1 the heater is indicated generally by the numeral 10 and is connected to a hot water storage reservoir 11 by means of pipes 12 and 13. The heater 10 comprises a casing 14 having a partition 15 therein dividing the same into a water space 16 and a combustion space 17. A hinged door 18 permits access to said combustion space. A burner 19 is located at the bottom of the combustion space 17 and may be of any suitable design adapted to burn any suitable fuel. A heating coil 20 is located at the combustion space 17 and a second coil 21 is located in the water space 16. The lower ends of said coils are connected together by means of a pipe connection 22. The upper ends of said coils are connected together by means of a pipe connection 23. The coils 20 and 21 and connections 22 and 23 constitute a circulating path for water heated by the flame from burner 19. The water space 16 is provided with a cover 24 and is connected to pipes 12 and 13 leading to the reservoir 11. A pipe 25 connects the pipe 13 with the pipe connection 23 and serves to maintain a proper quantity of circulating water and to prevent excess pressure in the coils 20 and 21. The pipe 25 includes an expansion coil 26.

In the operation of the apparatus, the circulating water is heated in coil 20 to a temperature sufficient to deposit the encrusting solids. The convection current caused by the heating circulates the water through coils 20 and 21. In coil 21 the heat is transferred from the circulating water to the water in the water space 16. The convection current developed in the space 16 removes the heated water through pipe 13 to the tank 11 and moves cold water from the said tank through pipe 12 to water space 16. Since the water in both the pipe connection 23 and pipe 13 is at a relatively high temperature, there is small tendency for a two-way convection current to be established in pipe 25, thus the softness of the circulating water is not greatly affected by addition of water. The use of the expansion coil 26 takes care of expansion of the heated cirulating water and prevents drawing in of any great quantity of hard water when the said circulating water is cooled. The form of heater herein illustrated is particularly applicable to household use. In such use it is often desirable in winter time to heat the water by means of a coil placed within the furnace used to heat the house. The said furnace coil may be connected directly to connections 22 and 23 and, therefore, functions in exactly the same manner as the coil 20.

When it is desired to heat the water in space 16 above the temperature of deposition of chemicals, the same apparatus is applicable and presents advantages over apparatus heretofore in use. In that case, such solids are deposited upon the outside of the tubes of coil 21 from which they may be easily removed. Such solids as do not adhere to the tubes drop to the bottom of chamber 16 where no harm can be done thereby.

In Figs. 5 and 6 there is illustrated an alternative form of heater embodying the invention in which a cylindrical casing 114 is divided by means of a partition 115 into a water space 116 and a heating space or combustion space 117. A burner 119 is located at the lower end of the combustion space 117 and serves to heat water in a coil 120 contained in the said combustion space. A coil 121 is contained in the water space 116 and connects at its lower end with the lower end of the coil 120 by means of a pipe 122. The upper ends of coils 120 and 121 are connected by means of a pipe 123. The water space 116 is fitted with a cold water intake pipe 112 and a hot water outlet pipe 113 which may be connected to a hot water reservoir similar to that illustrated in Fig. 1. A pipe 125 connects the pipe 113 with the pipe 123 and serves a purpose analogous to pipe 25 in the previously described apparatus. The pipe 125 is looped about the heater as shown in Fig. 5 for the purpose of adding sufficient length thereto to provide for expansion of water heated in the circulating system. A pair of pipes 127 and 128 lead from the lower and upper ends of the coils 121 and 122 and may be connected to heating coils located within a house heating furnace as previously mentioned.

In the operation of this form of apparatus, circulating water is heated in the primary heat-exchanging element, coil 120, and circulates through the said coil and through coil 121. The water in coil 121 gives up its heat to the water in the water space 116 without ordinarily raising the said water to a temperature at which solids will be deposited. In addition, the partition 115 serves as a heat transfer surface but since the flame from burner 119 is largely confined within the interior of coil 120 this transfer of heat ordinarily does not serve to bring the water in the space 116 above the desired temperature.

The invention claimed is:

1. Apparatus for heating hard water including a casing, a partition in said casing dividing the same into a closed water chamber and a heater space, an inlet pipe for introducing water to be heated into said water chamber, an outlet pipe for removing heated water therefrom, a coil in said water chamber, a heater coil in said heater space, means for heating water in said heater coil, connections between said coils for permitting circulation of heated water therethrough for heating the water in said water chamber, a connection between said coils and said outlet pipe for maintaining equal pressure upon the water in said coils and said water chamber, and an expansion coil associated with said last-mentioned connection.

2. Apparatus for heating water including a casing, a second casing surrounding the same and forming a water space between said casings, a primary heating coil within said first-mentioned casing, a secondary heating coil within said water space, means for heating water in said primary coil, connections between said coils for permitting circulation of water therethrough, an outlet pipe from said water space, and a pipe connection between said outlet pipe and said coils, said pipe connection being looped about said heater to provide sufficient length for accommodation of expansion of heated water.

3. Apparatus for heating hard water including a closed water chamber, an inlet pipe for introducing water to be heated into said water chamber, an outlet pipe for removing heated water therefrom, a coil in said water chamber, a heater coil, means for heating water in said heater coil, connections between said coils for permitting circulation of heated water therethrough for heating water in said water chamber, a connection between said coils and said outlet pipe for maintaining equal pressure upon the water in said coils and said water chamber, and an expansion coil associated with said last-mentioned connection.

HARRY A. MILLS.